(12) United States Patent
Chien et al.

(10) Patent No.: US 12,290,083 B2
(45) Date of Patent: May 6, 2025

(54) HEAT STABLE RAPESEED PROTEIN COMPOSITION

(71) Applicant: DSM IP ASSETS B.V., Heerlen (NL)

(72) Inventors: Ya-Hui Chien, Echt (NL); Arjen Sein, Echt (NL); Johanna Corline Margriet Vink, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 497 days.

(21) Appl. No.: 17/620,010

(22) PCT Filed: Jun. 18, 2020

(86) PCT No.: PCT/EP2020/066980
§ 371 (c)(1),
(2) Date: Dec. 16, 2021

(87) PCT Pub. No.: WO2020/254504
PCT Pub. Date: Dec. 24, 2020

(65) Prior Publication Data
US 2022/0304332 A1    Sep. 29, 2022

(30) Foreign Application Priority Data
Jun. 21, 2019 (EP) ..................... 19181693

(51) Int. Cl.
| A23B 7/157 | (2006.01) |
| A23J 3/14 | (2006.01) |
| A23L 2/38 | (2021.01) |
| A23L 2/66 | (2006.01) |
| A23L 25/00 | (2016.01) |
| A23L 29/262 | (2016.01) |
| A23L 29/269 | (2016.01) |

(52) U.S. Cl.
CPC . *A23J 3/14* (2013.01); *A23L 2/38* (2013.01); *A23L 2/66* (2013.01); *A23L 25/30* (2016.08); *A23L 29/262* (2016.08); *A23L 29/272* (2016.08)

(58) Field of Classification Search
CPC .......... A23J 3/14; A23L 25/30; A23L 29/262; A23L 29/272; A23L 2/38; A23L 2/66
USPC ......................................................... 426/106
See application file for complete search history.

(56) References Cited

U.S. PATENT DOCUMENTS

| 6,475,539 B1 | 11/2002 | Dewille |
| 2004/0039174 A1 | 2/2004 | Barker |
| 2010/0041871 A1 | 2/2010 | Segall |
| 2010/0068370 A1 | 3/2010 | Segall |
| 2012/0039970 A1 | 2/2012 | Köpsel et al. |
| 2013/0129879 A1 | 5/2013 | White |
| 2014/0256914 A1 | 9/2014 | Green |
| 2016/0031950 A1 | 2/2016 | Jaramillo Freydell |
| 2019/0254303 A1 | 8/2019 | Shi et al. |
| 2019/0307149 A1 | 10/2019 | Willemsen et al. |
| 2020/0154732 A1 | 5/2020 | Shi et al. |

FOREIGN PATENT DOCUMENTS

| CN | 108968079 A | 12/2018 | |
| DE | 102014005466 A1 | 10/2015 | |
| EP | 2736351 A1 | 6/2014 | |
| WO | 2005102074 A1 | 11/2005 | |
| WO | 2007/066233 A2 | 6/2007 | |
| WO | 2008/017039 A2 | 2/2008 | |
| WO | 2010/057024 A1 | 5/2010 | |
| WO | 2017/102535 A1 | 6/2017 | |
| WO | 2018/007492 A1 | 1/2018 | |
| WO | WO-2018007508 A1 * | 1/2018 | ............. A23D 7/003 |
| WO | 2018/122021 A1 | 7/2018 | |
| WO | 2019115280 A1 | 6/2019 | |

OTHER PUBLICATIONS

Sosulski et al; Composition of polar lipids in rapeseed. J Am Oil Chem Soc 58, 561-564. (Year: 1981).*
International Search Report received in international application No. PCT/EP2020/066980, mailed Sep. 23, 2020, 2 pages.
Wüstenberg, Cellulose and Cellulose Derivatives in the Food Industry: Fundamentals and Applications, pp. 1-4 2015.
Campbell et al., "Canola/Rapeseed Protein: Future Opportunities and Directions—Workschop Proceedings of IRC 2015", Plants, vol. 5, No. 2, Apr. 13, 2016.
International Search Report of PCT/EP2017/066908, Published Nov. 1, 2018.
Arntfield, "Canola and other oilseed proteins," Phillips G. O. and VIfilliams P. A. Handbook of Food Proteins, pp. 290-315 2011.
EFSA (European Food Safety Authority), "Scientific Opinion on the safety of "rapeseed protein isolate," as a Novel Food Ingredient," EFSA Journal; vol. 11(10); p. 3420 2013.
Emerton, "Essential Guide to Food Additives" (2nd Edition), Leatherhead Publishing. [ISBN 10: 1904007635 / ISBN 13: 9781904007630] 2003.
Experimental report Apr. 2024.
Fallourd, et al., "Ingredient selection for stabilisation and texture optimisation of functional beverages and the inclusion of dietary fibre," Functional and Speciality Beverage Technology, Woodhead Publishing Series in Food Science, Technology and Nutrition; pp. 3-38 2009.
Laaksonen, et al., "Astringent Food Compounds and Their Interactions with Taste Properties," Department of Biochemistry and Food Chemistry. Functional Foods Forum University of Turku 2011.
Li, et al., "Physical stability and microstructure of rapeseed protein isolate/gum Arabic stabilized emulsions at alkaline pH," Food Hydrocolloids, v88, pp. 50-57 2019.
Mahungu, et al., "Emulsifiers," Branen et al. (eds.): Food Additives, Second Edition, Marcel Dekker, Inc. 2002.

(Continued)

Primary Examiner — Brent T O'Hern
(74) Attorney, Agent, or Firm — McBee, Moore & Vanik IP, LLC

(57) ABSTRACT

The present invention is directed to a composition comprising rapeseed protein, a hydrocolloid, and a vegetable oil, and to the use of such composition in food products such as a beverage.

15 Claims, No Drawings

(56) References Cited

OTHER PUBLICATIONS

Noureddini, et al., "Densities of Vegetable Oils and Fatty Acids," Chemical and Biomolecular Engineering Research and Publications [DigitalCommons@University of Nebraska—Lincoln] Dec. 1992.
Peyrot des Gachons, et al., "Opponency of astringent and fat sensations," Curr Biol.; v22(19); pp. R829-R830 Oct. 9, 2012.
Supertein®, "httpszllweb.archive.orgM/20180904081142/httpszllwww.burcon.ca/products/canola-proteins/supertein/", The Wayback Machine 2019.
Von der Haar, et al., «Rapeseed proteins—Production methods and possible application ranges,☐» OCL☐; v.21(1) D104 Jan. 2014.
Wanasundara, et al., "Canola/rapeseed protein-functionality and nutrition," OCL; vol. 23 [DO—10.1051/ocl/2016028] 2016.
Wanasundara, et al., "Proteins From Canola/Rapeseed: Current Status," Sustainable Protein Sources. Elsevier Inc., pp. 285-304 2017.
Whitepaper, "Thermal Processing of Food," https://safefood360.com/whitepapers/preview/thermal-processing-of-food/ 2014.
Wüstenberg (Ed.), "Cellulose and Cellulose Derivatives in the Food Industry: Fundamentals and Applications," General Overview of Food Hydrocolloids, pp. 1-66 2015.
Gerzhova et al. "Study of total dry matter and protein extraction from canola meal as affected by the pH, salt addition and use of zeta-potential/turbidimetry analysis to optimize the extraction conditions", Food Chemistry, Elsevier Ltd, NL, vol. 201, Jan. 22, 2016, pp. 243-252, XP029413712, ISSN 0308-8146 Jan. 22, 2016.
Anonymous: "California High Oleic Safflower Oil", Internet Article, 'Online! 2002, XP002331017 Retrieved from the Internet: URL:http://www.oilseedssf.com/health/health.html>' retrieved on Jun. 8, 2005.
Aluko et al., "Limited enzymatic proteolysis increases the level of incorporation of canola proteins into mayonnaise", Innovative Food Science and Emerging Technologies, Elsevier, Amsterdam, NL, vol. 6, No. 2, Jun. 1, 2005.
International Search Report of PCT/EP2017/066871, Published Nov. 1, 2018.
International Search Report of PCT/US2005/012859, Published Mar. 11, 2005.

\* cited by examiner

HEAT STABLE RAPESEED PROTEIN COMPOSITION

CROSS-REFERENCE TO RELATED APPLICATIONS

This application is the National Stage entry of International Application No. PCT/EP2020/066980, filed 18 Jun. 2020, which claims priority to European Patent Application No. 19181693.3, filed 21 Jun. 2019.

BACKGROUND

Field

Field of the Invention

The present invention is directed to a composition comprising rapeseed protein, a hydrocolloid, and a vegetable oil, and to the use of such composition in food products such as a beverage.

Description of Related Art

Food products comprising plant proteins as alternative to animal-derived proteins nowadays receive attention because of consumer concerns about the environmental impact of animal-based products and the beneficial nutritional characteristics of plant-based foods. In particular, beverages based on plant proteins as alternative to dairy products such as milk, yoghurt or ice cream have gained popularity. Plant proteins may be derived from a variety of legumes and pulses such as soybean, pea, chickpea, fava bean, lentil, mung bean, peanut, lupin; oil seeds/cabbages such as rapeseed or canola, sunflower, camelina, sesame; cereals and pseudo cereals, such as wheat, barley, oat, rice, sorghum, quinoa, buckwheat; nuts, such as almond, hazelnut, walnut, cashew; coconut; nightshades such as potato.

Unfortunately, addition of plant proteins into food products with a high water activity/content, such as beverages, can lead to physio-chemical instability issues such as protein sedimentation or precipitation of food particles. This occurs particularly upon heat treatment such as is necessary in order to pasteurize or sterilize the product for shelf life. In WO 2018/122021 this problem has been addressed by subjecting the aqueous plant-protein composition to mixing at high shear rate and high shear load as part of the manufacturing process of the beverage.

Furthermore, in foods with a high water content, such as beverages, plant proteins are perceived as astringent, often an unwanted sensory attribute.

The instant invention is concerned with food products such as a beverage comprising a particular plant protein, rapeseed protein. Unfortunately, this protein usually is no exception to the problems outlined above, i.e. aggregation and/or sedimentation can occur under certain circumstances used during the production of beverages. For example, many beverage applications require a pasteurization or a sterilization step during the production stage. A problem associated with the use of rapeseed protein in beverages is that aggregation occurs after treatment at elevated temperatures. This phenomenon not only occurs at high sterilization temperatures (UHT, Ultra-High Temperature, i.e. 120 to 150° C.), but also at relatively low pasteurization temperatures (i.e. 70 to 95° C.). In addition, also taste is being perceived as astringent and/or bitter.

There is therefore a need for a food composition comprising rapeseed protein that does not lead to any or all of the problems mentioned above.

SUMMARY

In the context of the present invention, the term "astringency" refers to the dry, puckering mouth feel similar to that caused by tannins that are for example found in many fruits or by proteins, especially in an acidic environment. Food products with tannins (such as unripe fruits) or polyphenols (red wine, dark tea) are generally considered astringent. Astringency of solutions comprising rapeseed protein is another problem for which solutions are sought.

The term "bitterness" as used herein refers to the most sensitive of tastes and is perceived by many to be unpleasant, sharp or disagreeable. Common bitter beverages include unsweetened coffee and cocoa, beer, bitters and tonic water.

The term "fullness" as used herein refers to the feeling of full, round body in the mouth. A soup with yeast extract has more "fullness" then without, the same counts for full fat yoghurt versus low fat yoghurt and an alcoholic beverage versus its non-alcoholic equivalent.

The term "liquorice" as used herein refers to a taste sensation/component present in the sweet root of *Glycyrrhiza glabra* or in stevia plant species.

The term "sweetness" as used herein refers to the basic taste most commonly perceived when eating foods rich in sugar.

The term "thickness" as used herein refers to firmness in the mouth and represents the force needed to push the product in between tongue and palate.

The term "modifying" refers to either increasing or decreasing depending on the aimed goal.

By the expression "a hydrocolloid" is to be understood a type of hydrocolloid. By the expression "a vegetable oil" is to be understood a type of vegetable oil or fat. By the expression "an emulsifier" is to be understood a type of emulsifier.

As used herein, all the percentages are by weight (wt %) of the total weight of the beverage unless expressed otherwise. All ratios expressed herein are on a weight/weight (w/w) basis unless expressed otherwise.

In a first aspect there is provided a composition comprising rapeseed protein, a hydrocolloid, a vegetable oil, and water wherein the amount of rapeseed protein is from 0.5-10% (w/w), wherein the amount of hydrocolloid is from 0.02-1% (w/w), and wherein the amount of vegetable oil is from 0.5-15% (w/w). Such a composition can be a food with a high water level, up to 99% (98.98%) (wt) of water, such as beverages, neutral pH plant-protein-based milk equivalents, non-flavored or flavored, fermented plant-protein-based products such as yoghurt-equivalents or plant-based equivalents of fresh cheese/quarg/cottage cheese, ice cream, whipping creams, coffee creams, cooking creams, dressings and sauces, and low pH refreshing beverages and soft drinks.

DETAILED DESCRIPTION OF A PREFERRED EMBODIMENT

The rapeseed used to obtain the rapeseed protein isolate as applied in the instant invention is usually of the varieties *Brassica napus* or *Brassica juncea*. These varieties contain low levels of erucic acid and glucosinolates, and are the source of canola, a generic term for rapeseed oil comprising less than 2% erucic acid and less than 30 mmol/g glucosinolates. The predominant storage proteins found in rapeseed are cruciferins and napins. Cruciferins are globulins and are the major storage protein in the seed. A cruciferin is composed of 6 subunits and has a total molecular weight of approximately 300 kDa. Napins are albumins and are low molecular weight storage proteins with a molecular weight of approximately 14 kDa. Napins are more easily solubilized and are primarily proposed for use in applications where solubility is key. Rapeseed proteins can also be divided into various fractions according to the corresponding sedimentation coefficient in Svedberg units (S). This coefficient indicates the speed of sedimentation of a macromolecule in a centrifugal field. For rapeseed proteins, the main reported fractions are 12S, 7S and 2S. Napin is a 2S albumin, and cruciferin is a 12S globulin. In the context of the present invention, the rapeseed protein isolate comprises from 15 to 65% (w/w) cruciferins and from 35 to 85% (w/w) napins, the total being equal to or less than 100%. In one embodiment the rapeseed protein isolate comprises from 40 to 65% (w/w) cruciferins and from 35 to 60% (w/w) napins, the total being equal to or less than 100% (w/w).

Advantageously, rapeseed protein is a natural and versatile protein source useful for many food applications, including beverages. In addition, rapeseed protein isolate has a sweetness making it suitable as a substitute for high-calorie sweeteners such as sucrose and the like. Interestingly, products made with rapeseed protein isolate, obtained for example as described in WO 2018/007492, are soluble at pH values ranging from pH 3 to 9.

In an embodiment, the composition further comprises an emulsifier. An emulsifier promotes formation and/or stability of emulsions. Suitable emulsifiers may be the ones known to the skilled person, for example phospholipids (e.g. lecithin and the like), or calcium, magnesium, potassium, or sodium salts of fatty acids, mono- and diglycerides (MDG) and derivatives thereof such as lactic acid esters ("Lectem") of MDG, acylated tartaric acid esters ("Datem") of MDG, sorbitan esters of monostearate (tweens and spans). Phospholipids are natural amphiphilic molecules found in the cell and organelle membranes of animal, plant, and microbial species. These phospholipids can be isolated, purified, and utilized as surface-active ingredients in the food industry, where they are typically referred to as lecithin. The lecithin used in the food industry is usually extracted from soybeans, egg yolk, milk, sunflower kernels, or rapeseeds. Lecithin ingredients are typically mixtures of different phospholipids, with the most common being phosphatidylcholine, phosphatidylethanolamine and phosphatidylinositol. Also fractions of lecithins or modified by chemical or enzymatic treatments can be used, such as partially hydrolyzed lecithins used in oil-in-water emulsions.

In an embodiment, the composition has a pH, when measured at 20±2° C., between 5.0 and 9.0, or between 6.5 and 8.0. The composition of the present invention does not form unwanted aggregates upon heating. This effect is notably pronounced in so-called neutral pH beverages, i.e. beverages in which the pH, when measured at 20±2° C., is from 5.0 to 9.0, or from 6.5 to 8.0. Formation of aggregates as determined by particle size analysis is negligible after heat treatment such as sterilization (at 144° C. for 4 seconds) at pH values higher than 6.5, i.e. from 6.75 to 7.82. The same applies for pasteurization (at 90° C. for 20 seconds).

It was found that instability associated with the production of emulsion-based beverages comprising rapeseed protein can be overcome by addition of hydrocolloids, optionally in combination with sufficient shear (such as high-pressure homogenization). Moreover, the instant invention demonstrates that by making an oil-in-water emulsion, rapeseed protein is more resistant to aggregation upon heating. Surprisingly, the composition of the instant invention in addition reduces the astringent mouthfeel of highly aqueous liquids containing plant proteins, in particular rapeseed protein. The combination of rapeseed protein, a vegetable oil and an emulsifier is known from WO 2018/007508 focusing at the preparation of food emulsions such as mayonnaise, however this document does not address the problem of instability and astringency in beverages.

In an embodiment, the amount of rapeseed protein relative to the total composition is from 0.5-10% (w/w), or from 1.5-5% (w/w). In another embodiment, the total amount of hydrocolloid (single ingredient or mixture of more than one) is from 0.02-1% (w/w), or from 0.2-0.5%. In another embodiment, the amount of vegetable oil is from 0.5-80% (w/w), or from 0.6-30%, or from 1-5% (w/w). In yet another embodiment, the amount of emulsifier is from 0.05-0.5% (w/w) or from 0.1-0.3% (w/w).

In an embodiment, the weight ratio between oil and protein is at least 1:3. For example, the weight ratio between oil and protein may be 2:3, 1:1 or 3:1 or the like.

Use of hydrocolloids in beverages is known. For example, WO 2010/057024 describes the addition of hydrocolloids having an intrinsic viscosity of 5 to 600 mL/g (capillary flow viscosity) to improve flavor and mouthfeel, however there is no mention or suggestion of an effect related to prevention of the formation of aggregates upon heating of protein solutions or suspensions.

Hydrocolloids are a diverse group of long chain polymers characterized by their property of forming viscous dispersions and/or gels when dispersed in water. In the context of the invention, suitable hydrocolloids are galactomannans (guar gum, locust bean gum and tara gum), gellan (including low or high acyl gellan), xanthan, pectins, alginates, carrageenans, gum Arabic, cellulose derivatives such as carboxymethyl cellulose, hydroxypropylmethyl cellulose, methyl cellulose, native and modified starches and the like.

Also, combinations of several hydrocolloids, like carboxymethyl cellulose and high acyl gellan, may be employed. Hydrocolloids may be classified in a group of hydrocolloids that have a thickening effect, for example suitable for mouthfeel and texture, and hydrocolloids that give colloidal stability.

Addition of oil phases for the preparation of beverage emulsions are known. In WO 2007/066233, these oil-in-water emulsions are based on an oil phase, an aqueous phase and pectin, and they were reported to show enhanced emulsifying properties and stability. However, only certain types of beverages can be prepared from such oil-in-water emulsions and no information on the sensory properties or on the effects related to prevention of the formation of aggregates upon heating is provided. In the context of the invention, suitable oils are vegetable oils like coconut oil, corn oil, olive oil, palm oil, palm kernel oil, rapeseed oil, soya bean oil, sunflower oil and the like.

Due to the emulsifying properties of certain hydrocolloids (e.g. gum Arabic is used as a food emulsifier), the concept of hydrocolloids and emulsifiers may have overlap. Hydrocolloids as emulsifiers may be differentiated from the other commonly used emulsifiers, in that the former are macromolecular while the latter are, usually, smaller molecular with molecular weights seldom exceeding 1000 g/mol.

In an embodiment, the composition may further comprise sweetening agents and/or flavoring agents and/or coloring agents and/or calcium salts. Advantageously, the amount of added sweetening agents may be relatively low, or even zero, resulting from the phenomenon that rapeseed protein has a sweet taste. Calcium salts, such as for example calcium phosphate, have the advantage that the nutritional value of dairy milk can be mimicked, advantageously without negative effects such as a decrease in protein solubility.

In another embodiment, the amount of water in the composition of the present invention is almost zero, i.e. from 0.001-1% (w/w), or from 0.01-0.1% (w/w). Such compositions may be prepared by known drying techniques such as spray-drying or lyophilization and the like. Advantageously, compositions with low water content are easy to handle and/or cheap to transport. The dried composition can then be further employed in other food products such as powder meal replacement products, that can be consumed after redispersion of the powdered mix into water.

Surprisingly, the composition of the present invention not only resolves the issue of unwanted formation of aggregates after heating, but also resulted in unexpected changes in sensory attributes of the rapeseed protein. Compared to a reference solution of rapeseed protein isolate in water, it was found that the compositions of the present invention further comprising a hydrocolloid, a vegetable oil, and optionally an emulsifier displayed improved sensory characteristics. Notably, astringency associated with rapeseed is reduced in the composition of the present invention. Besides the flavor attributes, the mouthfeel also improved for fullness, thickness, and creaminess. In addition, subsequent heat treatment improved the mentioned mouthfeel characteristics. This effect appeared slightly more pronounced for longer heating at 90° C. (pasteurization) than it was for shorter heating at 144° C. (sterilization).

Different aspects of sensory and/or mouth feel of a beverage comprising rapeseed protein can be influenced using the composition and/or method of the present invention.

Advantageously, the composition and/or method of the invention relates to modifying sensory attributes such as astringency, bitterness, creaminess, fullness, liquorice, sweetness, and/or thickness of a beverage comprising rapeseed protein by emulsification and optionally heating. Preferably, the composition and/or method of the invention enables modification of at least one of the mentioned sensory properties.

To quantify astringency, samples are compared by a trained sensory panel to a blank (rapeseed protein isolate solution in water) by means of Quantitative Descriptive Analysis (QDA). The panel consists of from 10 to 14 members (such as 12, 13, or 14 members), and may evaluate the products also on other attributes, in addition to astringency. During the test the samples are offered according to an optimally balanced design and are scored on 0-100 unstructured line scales in EyeQuestion in duplicate. The products may be given one-by-one to the panelists and are served at 20±2° C. In an embodiment, products are presented in white polystyrene cups with a white polystyrene spoon to prevent sedimentation during tasting. During the training of the panel, astringency is defined by and related to the reference green tea.

In one embodiment, the composition is a food product such as a beverage comprising rapeseed protein, a hydrocolloid, a vegetable oil, and optionally an emulsifier. The beverage may be in the form of a concentrate, a powder, or a liquid beverage, such as a ready-to-drink beverage. In an embodiment, the composition is used such that the rapeseed protein is present in the beverage in an amount of about 0.5 to 10% (w/w), 1 to 8% (w/w), 1.5 to 5% (w/w), or 2 to 5% (w/w) by weight of the beverage. In a further embodiment, the beverage comprises oil or fat in an amount up to 6.0% (w/w), or about 2.0 to 5.0% (w/w) by weight of the beverage. In a further embodiment, the beverage comprises sugars in an amount of from about 0.5 to 10% (w/w) by weight of the beverage, or alternative sweeteners such as aspartame, sucralose, sugar alcohols, steviol glycosides and the like. In a further embodiment, the beverage is a shelf-stable ready-to-drink beverage that is stable for at least nine months at 20±2° C.

In another embodiment, the composition is a beverage comprising rapeseed protein, a hydrocolloid, a vegetable oil, and optionally an emulsifier and further comprising another plant material. Examples are so-called plant-based milks which can be made from a plant source by dispersing seeds, grains or nuts into an aqueous phase, optionally removing part of the fibers and cell debris by filtration or centrifugation. Such plant materials may be derived from a variety of legumes and pulses such as soybean, pea, chickpea, fava bean, lentil, mung bean, peanut, lupin; oil seeds/cabbages such as rapeseed or canola, camelina, sesame, sunflower; cereals and pseudo cereals, such as wheat, barley, oat, rice, sorghum, quinoa, buckwheat; nuts, such as almond, hazelnut, walnut, cashew; coconut; nightshades such as potato. Further ingredients such as sweeteners, flavors and minerals (such as tricalcium phosphate to obtain a calcium level comparable to dairy milk, in a range of from 0.05 to 0.5% (w/w)) may be added. Such beverages need to undergo thermal treatment for microbiological stability, such as 90-95° C. for 20 seconds or Ultra-High Temperature (144° C. for 3-6 seconds). Many plant-based milks are relatively low in protein content, and therefore the composition of the instant invention fulfills the need to enrich such beverages with additional protein, to arrive at a nutritional value that is better comparable to dairy milk.

In a further embodiment, the composition with reduced astringency according to the invention can be a food product at a pH of 2-9, more preferably 3.5-5 and 6.5-8, such as a low pH refreshing beverage or sour cream equivalent or a fresh cheese equivalent, or sauces and dressings.

A further embodiment is wherein the composition of the invention is a stable rapeseed protein-enriched plant-based beverage that is low in astringency. This can, for instance, be a rapeseed protein-enriched almond milk, a rapeseed protein-enriched oat milk, a rapeseed protein-enriched rice milk, a rapeseed protein-enriched coconut milk, or a rapeseed protein-enriched nut milk such as a cashew nut milk. The vegetable oil phase of such a product can (at least partly) be the lipid or lipids present in the nut, grain or seed itself, optionally supplemented with another oil, preferably from vegetable origin.

In a second aspect, the invention provides a method for the preparation of a composition comprising rapeseed protein, a hydrocolloid, a vegetable oil, and water comprising the steps of:
  a) Preparing an aqueous solution comprising rapeseed protein,
  b) Preparing an aqueous solution comprising a hydrocolloid,
  c1) Mixing a vegetable oil and the solution obtained in step a), followed by addition of the mixture obtained in step b), or
  c2) Mixing the solutions obtained in steps a) and b), followed by addition of a vegetable oil,
  d) Emulsifying the mixture obtained in steps c1) or c2).

Suitable hydrocolloids are galactomannans (guar gum, locust bean gum and tara gum), gellan (including low or high acyl gellan), xanthan, pectins, alginates, carrageenans, gum Arabic, cellulose derivatives such as carboxymethyl cellulose, hydroxypropylmethyl cellulose, methyl cellulose, native and modified starches and the like. Also, combinations of several hydrocolloids, like carboxymethyl cellulose and high acyl gellan, may be employed.

In an embodiment, the composition further comprises an oil or fat. The oil can be of vegetable, algal, or animal origin. Suitable vegetable oils are canola oil, coconut oil, corn oil, olive oil, palm oil, palm kernel oil, peanut oil, rapeseed oil, rice bran oil, sesame oil, soy bean oil, sunflower oil and the like or mixtures thereof. An oil may also comprise oil from algae. An oil or fat may also be milk fat.

Emulsification may be carried out with a high shear mixer or a homogenizer, or alternative equipment and methods known to the skilled person.

In an embodiment, an emulsifier may be added before, after or during steps c1) or c2). An emulsifier may facilitate emulsion formation and/or stabilize an emulsion. Suitable emulsifiers may be proteins and phospholipids (e.g. lecithin and the like), or calcium, magnesium, potassium, or sodium salts of fatty acids.

In an embodiment, the oil droplet diameter (D50) of the composition of this invention is below 200 µm, such as from 1 to 100 µm or from 2 to 50 µm, or from 3 to 20 µm, before heat treatment is applied.

In an embodiment, a calcium salt may be added during any one of steps a), b), c1), c2) or d) of the method of the second aspect. Calcium ions may mimic the nutritional value of dairy products like milk. One possible source of calcium ions is tricalcium phosphate or calcium carbonate.

In industrial processes the high-shear dispersion step often follows the heating step. In an embodiment of the invention it is advantageous to pre-shear the emulsion of the invention. Thus, according to the invention, a fine emulsion may be made by applying sufficient shear by processes known in the art. The average droplet size of the oil droplets (D50) should be below 50 µm, more preferably below 25 µm, before the heat treatment is applied. After the heating step, another high-shear step may be executed.

In a third aspect, the invention provides use of the composition of the first aspect in the preparation of a beverage. In an embodiment said preparation of a beverage comprises pasteurization and/or sterilization, i.e. treatment at a temperature of from 70° C. to 150° C. for 2 seconds to 5 minutes following addition of said composition to said beverage.

In another embodiment the use may be for the preparation of a plant-protein fortified beverage. Suitable examples are clean label e.g. so-called functional beverages such as protein waters, low in calories, high in protein and without sugar, or beverages such as almond milk. Currently these beverages are mainly whey-based rather than plant-based. Lack of astringency, as achieved by the composition of the instant invention, is key for such clear water-like beverages.

In a fourth aspect, the invention provides a beverage comprising the composition of the first aspect of the invention. Non-limiting examples of such beverages are protein waters or protein-enforced beverages such as protein-enforced almond milk. In an embodiment the beverage is packaged in a container which may be a can or a bottle or the like, made from paper, glass, aluminum, a plastic and the like. Ideally the package has a volume that can hold beverage volumes that are normally supplied to consumers, i.e. from 0.2 to 2.5 L, for example 0.25 L, 0.3 L, 0.33 L, 0.5 L, 0.7 L, 0.75 L, 1 L or 1.5 L.

EXAMPLES

Materials

Rapeseed protein isolate was prepared from cold-pressed rapeseed oil seed meal as described in WO 2018/007492; the protein content was 90% (w/w). The resultant rapeseed protein isolate comprised in the range of from 40 to 65% (w/w) cruciferins and 35 to 60% (w/w) napins, contained less than 0.26% (w/w) phytate and had a solubility of at least 88% when measured over a pH range from 3 to 10 at a temperature of 23±2° C.

Carboxymethyl cellulose (AMD 254) was from DuPont, high acyl gellan gum (ND102) and low acyl gellan gum (Gellan WJ) was from DSM Hydrocolloids, Tongxiang, China), sodium alginate from the Modernist Pantry, Maine, USA, LM-pectin (APC310FB), from DSM Hydrocolloids, Tongxiang, China, locust bean gum (LBG, Modernist Pantry, Maine, USA). Sodium chloride was from Merck, tricalcium phosphate tribasic from Sigma Aldrich, sunflower oil was from Albert Heijn (the Netherlands). Sunflower lecithin was from Piping Rock (USA) or (Solec Z) from Unimills (Zwijndrecht, the Netherlands). Unless stated otherwise, all other chemicals were from Merck. High shear mixer was from Silverson, Monowave from Anton Paar (Oosterhout, the Netherlands), Thermomixer from Vorwerk (Switzerland), Homogenizer (M1100) from Microfluidics, Particle sizer (L513320) from Beckmann Coulter)

Test Methods

Measurement of pH
pH measurements were carried out at 20±2° C., unless otherwise mentioned, using a Radiometer model PHM220 pH meter equipped with a PHC3085-8 Calomel Combined pH electrode (D=5 MM).

Example 1

Preparation of Rapeseed Protein Emulsions

Rapeseed Protein Isolate Solution:
Rapeseed protein isolate (4.44 g) was weighed into a 500 mL beaker and filled up to 100 g with tap water. The solution was stirred with a stirring bar for at least 30 minutes at 20±2° C. to reach the optimum hydration of the protein.
Hydrocolloid Solution:
Carboxymethyl cellulose (3 g) and high acyl gellan (0.3 g) were weighed into a beaker and filled up to 75 g with tap water. To avoid poor wettability, water may be added first to the carboxymethyl cellulose. The solution was stirred for at least 30 minutes at 20±2° C. to reach the optimum hydration. Subsequently, the glass beaker was placed in a water bath of 87±2° C. for 10 min while the mixture was stirred. After cooling to 40±2° C. the mixture was used in the preparation of the rapeseed protein emulsion below.
Rapeseed Protein Emulsion:
Sunflower oil (1.8 g), sunflower lecithin (0.2 g), tricalcium phosphate (0.04 g), and the rapeseed protein isolate solution described above (87.96 g) were weighed into a 300 mL glass beaker. Subsequently, the hydrocolloid solution described above (10 g) was added. This was emulsified by vigorously mixing at maximum speed for 1.5 minutes using a high shear mixer (Silverson). After mixing, the pH was adjusted with aqueous hydrochloric acid (0.5 M) or aqueous sodium hydroxide (0.5 M) to a pH range of 6.75, or to the required pH. Corrected for the protein content of the rapeseed protein isolate, the resulting emulsion contained 3.5% (w/w) of rapeseed protein, 0.4% (w/w) of carboxymethyl cellulose, 0.04% (w/w) of high acyl gellan, 1.8% (w/w) of sunflower oil, and 0.2% (w/w) of sunflower lecithin.

Comparative Example 1

Thermal Treatment of Rapeseed Protein Isolate Solution

Rapeseed protein isolate solution (20 mL) was filled into a 30 mL wide neck tube and sealed with a fitting lid (both Monowave accessories, Anton Paar) with a stirring bar, and heated whilst stirring in the desirable conditions using a Monowave instrument:
  a. Low pasteurization: 72° C., 20 sec, 1200 rpm; cool down to 45° C.
  b. High pasteurization: 90° C., 20 sec, 1200 rpm; cool down to 45° C.
  c. Ultra-High Temperature: 144° C., 4 sec. 1200 rpm; cool down to 45° C.

In a first set of experiments the soluble protein content was measured by Dumas measurement of the supernatant, the results given in the Table below show that upon increasing heat load at pH 7 more protein falls out of solution.

TABLE

Remaining soluble protein after heat treatment at pH 4 or pH 7

| Heat regime | pH 4 | pH 7.0 |
| --- | --- | --- |
| Room temperature | 90.1% | 73.9% |
| 72° C., 20 sec | 88.3% | 68.9% |
| 90° C., 20 sec | 87.9% | 44.8% |
| 144° C., 4 sec | 95.6% | 47.7% |

In a second test, tricalcium phosphate was added to the neutral pH protein solution, to a total of 0.04 g tricalcium phosphate/100 mL of product to mimic the nutritional value of dairy milk. Protein solubility did not improve. The mixture was colloidally instable as seen by rapid aggregation and sedimentation of the solids upon heating.

Comparative Example 2

Aggregation of Plant Proteins Upon Thermal Treatment

Suspensions (20 mL, 3.5% w/w) of pea protein, rapeseed protein, rice protein, soy protein, and whey protein in water at pH 7 were treated under pasteurization conditions (90° C., 20 sec) and aggregate formation was monitored visually. The rapeseed protein suspension showed formation of aggregates (i.e. larger particles) that were significantly coarser compared to the other proteins. In the case of rapeseed protein, the aggregates were visible. The experiment was repeated under Ultra-High Temperature conditions (144° C., 4 sec) in which case pea protein, rice protein and whey protein showed minor aggregate formation whereas rapeseed protein showed significant aggregate formation, to the extend even that a clear layer was obtained between sedimented and floating aggregates.

Example 2

Thermal Treatment of Rapeseed Protein Emulsion

As the tests in Comparative Example 1 show obvious colloidal instability, hydrocolloids were added to the mixtures and heated as indicated. Two combinations of carboxymethyl cellulose and high acyl gellan gum were used, concentrations of carboxymethyl cellulose and gellan were 0.4 and 0.04% (w/w) and 0.2 and 0.02% (w/w), respectively.

Whilst the higher concentration of 0.4% (w/w) carboxymethyl cellulose and 0.04% (w/w) gellan was more colloidally stable (less severe sedimentation and aggregation upon heating), still that was not fully sufficient. In a next step, also vegetable oil plus emulsifier was added to the mixture which was thoroughly sheared using a Silverson High sheer mixer resulting in an emulsion with constituents as per the below Table. This emulsion was now heat treated to 90 or 144° C. as indicated above, resulting in stable emulsions that were homogeneous and did not display any aggregates.

TABLE

Composition of rapeseed protein emulsion

| Component | % (w/w) |
| --- | --- |
| Rapeseed protein isolate | 3.5 |
| Sunflower oil | 1.8 |
| Sunflower lecithin | 0.2 |
| Carboxymethyl cellulose | 0.4 |
| High acyl gellan gum | 0.04 |
| Tricalcium phosphate | 0.04 |
| Water | 94.3 |
| Total | 100 |

Example 3

Impact of pH on Stability of Rapeseed Protein Emulsion

Emulsions with compositions as outline in the Table of Example 2 were made as described in Example 1. The pH was carefully adjusted before the heat treatment in a range of 5.68-7.76. These emulsions were subjected to the heat treatments at 90° C. (pasteurization) and 144° C. (sterilization) separately (see Example 2 for details). After heat treatment the pH was measured again, and the particle size distribution was measured using laser light scattering (Beckmann Coulter LS13320). Results are given in the Table below, demonstrating that the pH increases after heat treatment, and also that the particles (droplets in protein flocs) are small after sterilization when the pH is above 6.5, before heat treatment. When the pH is below 6.5 before heat treatment, substantial aggregation has taken place.

TABLE

Particle size following pasteurization or sterilization at various pH values

| pH | | | Particle size (median; μm) | |
| --- | --- | --- | --- | --- |
| Start | Pasteurization | Sterilization | Pasteurization | Sterilization |
| 5.68 | 5.88 | 6.62 | Not measurable | Not measurable |
| 6.15 | 6.32 | 6.46 | 92.5 | Not measurable |
| 6.43 | 6.6 | 6.55 | 93.9 | Not measurable |
| 7.13 | 7.24 | 7.36 | 56.2 | 6.4 |
| 6.75 | 7.01 | 7.16 | 8.3 | 8.3 |
| 7.76 | 7.82 | 7.82 | 22.7 | 9.2 |

Example 4

Sensory Assessment of Rapeseed Protein Emulsion

Emulsions comprising rapeseed protein were prepared as described in Example 1 and subjected to various heat treatments.

The following samples were prepared:
Sample 1: Rapeseed protein isolate (3.5% w/w) in water
Sample 2: Rapeseed protein (3.5% w/w) emulsion according to Example 1
Sample 3: Sample 2 treated at 90° C. for 20 seconds
Sample 4: Sample 2 treated at 144° C. for 4 seconds Samples were compared by a trained sensory panel to a reference rapeseed protein isolate solution in water. The samples were evaluated by means of Quantitative Descriptive Analysis (QDA) with a sensory panel (n=13) on attributes relevant for the product in the test. During the test the samples were offered according to an optimally balanced design and were scored on 0-100 unstructured line scales in EyeQuestion in duplicate. The products were given one-by-one to the panelists and served at 20±2° C. The products were presented in a white polystyrene cups with a white polystyrene spoon to prevent sedimentation during tasting.

Data were analyzed using EyeOpenR. Statistically significant product differences were computed by means of ANOVA (Analysis of Variance) for each attribute. If a statistically significant product difference occurred, a Multiple Comparison Analysis (Fisher LSD) was computed to investigate which products differed from each other, the mean product score for an attribute followed by different letters are statistically different (p<0.05). For results see the below Table.

The results showed for quite some attributes a statistically significant difference between the samples. Consequently, the emulsification method of the invention provides a tool to adapt sensory aspects of rapeseed protein isolates as may be required depending on specific applications. Changes in sensory aspects were notably pronounced for mouthfeel attributes like fullness, astringency, thickness and creaminess, for flavor attributes like intensity, sweetness, bitterness, creaminess and liquorice, and for aftertaste attributes like intensity, bitterness and astringency.

TABLE

Results of ANOVA with Fisher's LSD (only applicable if a statistical product difference exits)

| Attribute | Sample 1 | | Sample 2 | | Sample 3 | | Sample 4 | | p-Value |
|---|---|---|---|---|---|---|---|---|---|
| Intensity-od | 27 | | 25 | | 26 | | 28 | | 0.56 |
| Sweet-od | 16 | | 14 | | 15 | | 14 | | 0.48 |
| Nutty-od | 15 | | 17 | | 20 | | 19 | | 0.34 |
| Grain-od | 23 | | 23 | | 25 | | 32 | | 0.09 |
| Paper-od | 19 | b | 19 | b | 20 | b | 27 | a | * |
| Off odor-od | 10 | | 11 | | 11 | | 8 | | 0.30 |
| Powdery/chalk-mf | 23 | | 28 | | 34 | | 34 | | 0.07 |
| Fullness-mf | 24 | c | 37 | b | 49 | a | 42 | ab | *** |
| Astringent-mf | 51 | a | 27 | b | 31 | b | 35 | b | *** |
| Thick-mf | 10 | c | 25 | b | 43 | a | 35 | ab | *** |
| Creamy-mf | 6 | c | 32 | b | 43 | a | 35 | ab | *** |
| Intensity-fl | 58 | a | 46 | b | 45 | b | 43 | b | *** |
| Sweet-fl | 38 | a | 19 | b | 15 | b | 15 | b | *** |
| Bitter-fl | 37 | a | 21 | b | 28 | ab | 27 | b | ** |
| Nutty-fl | 20 | | 25 | | 28 | | 26 | | 0.16 |
| Grain-fl | 25 | | 37 | | 34 | | 36 | | 0.05 |
| Bean-fl | 25 | | 30 | | 30 | | 30 | | 0.66 |
| Paper-fl | 19 | c | 25 | b | 29 | ab | 32 | a | *** |
| Cream-fl | 5 | b | 25 | a | 24 | a | 21 | a | *** |
| Liquorice-fl | 48 | a | 17 | b | 16 | b | 11 | b | *** |
| Off flavor | 9 | | 8 | | 14 | | 13 | | 0.09 |
| Intensity-at | 53 | a | 37 | b | 39 | b | 40 | b | *** |
| Bitter-at | 37 | a | 24 | b | 24 | b | 28 | ab | * |
| Astringent-af | 54 | a | 31 | b | 35 | b | 37 | b | *** |
| Mouthcoating-af | 19 | | 26 | | 28 | | 25 | | 0.08 |

Abbreviations:
af = after-feel;
at = aftertaste;
fl = flavor;
mf = mouthfeel;
od = odor
* $p < 0.05$
** $p < 0.01$
*** $p < 0.001$

Example 5

Determination of Lower Bound Oil to Protein Ratio

Emulsions comprising rapeseed protein were prepared as follows. A solution comprising rapeseed protein isolate (44.4 g filled up to 1000 g with water), was stirred for 30 min. Separately, a hydrocolloid solution was made (6 g of carboxymethyl cellulose and 0.6 g of high acyl gellan gum filled up with tap water to 150 g) and heated up at 87° C. An emulsion was made by combining varying amounts of oil and lecithin (see table below), 0.04 g of tricalcium phosphate, 87.9 g of the protein solution and 10 g of hydrocolloid solution. This mixture was sheared by a Silverson high-shear mixer (1.5 minute at maximum speed). Thereafter the pH was adjusted to 7 using a sodium hydroxide solution. Mixtures were heat-treated to 144° C. for 4 seconds, according to Example 1. The products were scored visually on their macroscopic stability, and by light scattering to obtain a particle size distribution. An internal panel of 6 persons scored the products on astringency The samples as per the below Tables were prepared, all with a protein content of about 3.3%, 0.6% carboxymethyl cellulose, and 0.06% gellan gum. Sample 5 is the reference comparable to what was tested in the previous experiments.

TABLE

Oil level of tested samples, their perceived astringency and qualitative emulsion stability.

| Sample | Oil | Lecithin | Total oil | Astringency | Emulsion stability after heat |
|---|---|---|---|---|---|
| 1 | 0 | 0 | 0 | High | No emulsions |
| 2 | 0.45 | 0.05 | 0.5 | Present | Unstable |
| 3 | 0.90 | 0.10 | 1 | A bit | Unstable |
| 4 | 1.35 | 0.15 | 1.5 | Not | Nearly stable |
| 5 (reference) | 1.80 | 0.20 | 2 | Not | Stable |
| 6 | 4.10 | 0.20 | 4.3 | Not | Stable |
| 7 | 6.40 | 0.20 | 6.6 | Not | Stable |

TABLE

Oil droplet sizes (μm) of tested samples.

| Sample | Total oil (%) | D10 | D50 | D90 |
|---|---|---|---|---|
| 1 | 0 | 51.5 | 354 | 707 |
| 2 | 0.5 | 172 | 427 | 735 |
| 3 | 1 | 154 | 395 | 647 |
| 4 | 1.5 | 78.0 | 332 | 623 |
| 5 (reference) | 2 | 1.65 | 64.8 | 251 |
| 6 | 4.3 | 0.95 | 7.39 | 179 |
| 7 | 6.6 | 2.34 | 6.26 | 14.1 |

Example 6

Sensory Assessment of Spray-Dried and Resuspended Rapeseed Protein Emulsion

An emulsion comprising 3.3% rapeseed protein isolate and oil (1.8% w/w) and lecithin (0.2% w/w) was prepared as described in Example 4, maltodextrin (9.12%, DE12, spray-drying aid), and spray dried on a lab spray drier. In a similar way a 3.3% protein solution (no emulsion, without oil) with additional maltodextrin (9.12% DE12) was spray dried. These spray-dried products were resuspended in water and compared to a freshly prepared emulsion (3.3% protein, 2% oil, no maltodextrin) by an internal panel of 6 persons for their astringency. The spray-dried product had the same (low) astringency score as the reference emulsion, and the spray-dried protein solution scored as high on astringency as commonly is found for CanolaPRO solutions. Therefore, it can be concluded that with spray-drying the emulsion remains low in astringency.

Example 7

Sensory Assessment of Rapeseed Protein Emulsion at Low pH

Emulsions comprising rapeseed protein were prepared as described in Example 5, however at low pH, in two ways: A: first the emulsion was made and then the pH was adjusted to 4, B: First the protein solution was adjusted to pH 4, then the emulsion was made, thereafter the pH was re-adjusted again. Emulsions were heat treated as per Example 1. These emulsions were assessed by an internal panel of 6 persons for their astringency and compared to a protein solution of 3.3% at pH 4, and the reference emulsion of pH 7 as described in Example 5. The low pH emulsions were more astringent than the reference (pH 7) emulsion, but not as astringent as a protein-only solution at low pH. No difference was found for astringency of both low-pH emulsions.

Example 8

Almond Milk Beverage Enriched with Rapeseed Protein Isolate

An almond milk beverage enriched with rapeseed protein isolate was made as follows.
Almond Dispersion (around 1200 g):
100 g blanched almonds were weighed in a 1 L-bottle and filled up to 1000 g with tap water. In total 200 g blanched almonds were divided over two bottles and soaked for about 18 hours, at 4° C. The soaking water was removed from the almonds, almonds were weighed and blended with fresh water. Per 100 g of almonds 500 g of water was added. The almonds were grinded in a Chufamix veggie drinks maker with a blender for about 2 min, per 100 g soaked almonds.
Protein Solution (1100 g):
43 g Rapeseed protein isolate was weighted in a 2 L beaker and 313 g tap water, 747 g almond dispersion, 0.49 g tricalcium phosphate and 1.19 g salt were added. Part of the water was first added to the protein powder to create a paste to improve wettability. The solution was stirred with a magnetic stirring rod for at least 30 min at room temperature to reach the optimum protein hydration.
Hydrocolloid Mixture (0.4% Carboxymethyl Cellulose/0.04% Gellan; 100 g):
8.17 g carboxymethyl cellulose, 0.82 g high acyl gellan and 91 g tap water were weighted. To avoid poor wettability, water was first only added to the carboxymethyl cellulose. When the carboxymethylcellulose was fully dissolved, gellan was added. The solution was stirred with a stirring rod for at least 30 min at room temperature to reach the optimum hydration of the hydrocolloids. The glass beaker was placed in a water bath at 87° C. for 10 min and stirred regularly. The mixture was cooled down to 40° C. before being added to the protein solutions.
Rapeseed Protein-Enriched Almond Milk (1000 g):
1.0 g of sunflower lecithin was poured into a plastic beaker and dissolved in 10.0 g of sunflower oil. 940 g of protein solution and 49 g of hydrocolloid mixture were added. The blend was mixed vigorously at maximum speed with the Silverson for 1.5 min. The pH was measured and adjusted from around 7.0 to 7.3 with a 4M NaOH solution.
Heat Treatment:
The Thermomix beaker was heated with water in advance to decrease heating time with the almond drink. The almond drink was kept at 90° C. for 20 seconds at 1.5 rotation speed (Thermomix value), having a total heating time of about 3 min.
This resulted in an almond milk beverage containing 3.4 wt % protein (3.2% from rapeseed protein isolate and 0.3% from almonds) and 4.4 wt % oil (3.4% from almonds and 1% from the extra added sunflower oil). This experimental product was tested by a trained sensory panel as described in Example 4 and compared to a commercial almond milk containing 1.3 wt % oil and 0.5 wt % protein. No significant differences were found between these products on the attributes astringency (mouthfeel and aftertaste), bitterness (mouthfeel and aftertaste), and off odor and off flavor. This proves that the method described by this invention can lead to commercially relevant plant-based milk equivalent beverages with nutritional values (in terms of protein level) comparable to dairy milk, that are not met by current commercial products.

Example 9

Ultra-High Temperature-Treated Almond Milk Beverage

An Ultra-High Temperature-treated almond milk fortified with rapeseed protein isolate was made on a pilot plant scale, similar to the lab scale product in Example 8. A 40 L premix was made with the composition outlined in the below Table.

TABLE

Final composition almond drink fortified with rapeseed protein isolate

| Ingredient | % (w/w) |
| --- | --- |
| Tap water | 90.76 |
| Almond; raw peeled; De Zuid-molen, the Netherlands | 4.38 |
| Rapeseed protein isolate | 3.20 |
| Sunflower oil | 1.00 |
| Carboxymethyl cellulose | 0.40 |
| Sunflower lecithin | 0.10 |
| Sodium chloride | 0.08 |
| Gellan; High acyl | 0.04 |
| Tricalcium phosphate tribasic | 0.04 |

6.5 kg raw almonds were soaked in 27 kg water for one hour. The water was drained, 32.5 kg of fresh water was added to the soaked almonds and these were milled by a vacuum cook-cutter (K64AC8, Seydelmann) at 5000 rpm for 45 seconds, and subsequently filtered over a 0.5 mm shaking filter (Russell finex 22), yielding an almond base. To make a protein base (1), 27.3 kg of that base was further diluted with 4.2 kg water, and 1.43 kg rapeseed protein isolate, 36 g sodium chloride and 184 tricalcium phosphate were added. This mixture was thoroughly sheared using a Silverson high-shear batch mixer (standard emulsor head and screen) and further stirred in a mixing tank for at least 30 minutes. Next to that, a hydrocolloid solution (2) was prepared by combining 178 g CMC powder and 17.8 g gellan into 10.8 kg water at room temperature, allowed to mix for at least 30 minutes and then heated to 87° C. in a water bath under stirring, and allowed to cool back to 40° C. The oil phase (3) was made by dissolving 57 g lecithin into 565 g sunflower oil at room temperature. To prepare the final premix, 29.6 kg of protein base (1), 9.95 kg of hydrocolloid solution (2) and 440 g of oil phase (3) were mixed and thoroughly sheared using a micro-cutter shear device, and the pH was set to around 7.9 by sodium hydroxide solution. This premix was sterilized using a multipurpose Ultra-High Temperature heating system (APV, SPP) with direct steam injection (144° C., 3 seconds), flash-cooled to 80° C. and homogenized by a two-stage high-pressure homogenizer (150/50 bar) at 60° C. and filled in plastic bottles. This gave smooth and fairly low viscous drinks with a good taste.

The particle size distribution (PSD) was measured on a Malvern Mastersizer 2000 using the general purpose (spherical) Mie model. The PSD of the premix showed two peaks: first peak around 6 µm corresponding to the single protein-coated oil droplet, and a second peak of around 200 µm reflecting flocculated protein-coated oil droplets. The final product after production showed three peaks, with top peak sizes of 0.2, 4.0 and 95 µm respectively. The small first peak represented small aggregated protein clusters without oil droplets, the second peak showed the single protein-coated oil droplet, and last peak reflected flocculated protein-coated oil droplets.

The dry matter content of the final product was 6.14% (w/w), measured using a Mettler Toledo drying balance.

Example 10

Effect of Emulsifier

The impact of lecithin was illustrated by comparing the same base composition (see example with and without lecithin (10% on oil phase). Standard drinks were produced similarly to what was described above, the compositions are given in the Table below.

First the a solution with 7% rapeseed protein isolate, 0.16% NaCl, 0.66% tricalcium phosphate (corresponding toe 120 mg Ca per 100 mL final product) was prepared: 140 g rapeseed protein isolate+1844 g tap water+3.2 g sodium chloride+13.2 g tricalcium phosphate, were combined and stirred for minimal 30 min. Next, the hydrocolloid solution (0.82% CMC and 0.082% high acyl-gellan) was prepared: 12.3 g CMC+1.23 g high acyl-gellan 1496.5 g tap water were combined, stirred for 30 min, heated to 87° C. in a water bath, and cooled down to room temperature. For one sample the oil and lecithin were mixed until all lecithin was dissolved in the oil. These three streams were combined and mixed for 1 min with a Silverson high-shear mixer at maximum speed. The pH was adjusted to 7.3 by a NaOH solution. Subsequently, the samples were heated under mild stirring to 90° C. in a Thermomix mixer, held for 20 seconds at 90° C. and then filled in glass bottles, and cooled in cold water, frequently shaking bottles during cooling. Finally the samples were homogenized by a high-pressure homogenizer (Panda 2K, GEA) at a total pressure of 230 bar, cooled to 10° C.

TABLE

With and without lecithin: composition of samples in wt %

| | With lecithin | No lecithin |
| --- | --- | --- |
| Rapeseed protein isolate | 3.5 | 3.5 |
| Sodium chloride | 0.08 | 0.08 |
| Tricalcium phosphate | 0.33 | 0.33 |
| High acyl-gellan | 0.04 | 0.04 |
| CMC | 0.4 | 0.4 |
| Sunflower oil | 1.8 | 2 |
| Sunflower lecithin | 0.2 | |

The products showed equal stability upon storage for 1 week: no phase separation was observed. By light scattering the products had nearly the same average particle size diameter after one week (40-50 µm), indicative for aggregated protein-covered oil droplets. The samples had the same appearance by light microscopy, no visual difference in oil droplet sizes were observed. It was concluded that lecithin is not strictly needed for this specific type of drinks.

Example 11

Emulsion-Based Drinks with Various Hydrocolloid Systems

In the way as described in the previous example, protein-based drinks were made varying the hydrocolloid combination as is shown in the Table below. The list includes a variant without hydrocolloids, and the same standard reference as in the previous example, the reference product without oil, and variants with different hydrocolloids. Preparation was as described in the previous example.

TABLE

Composition (in wt %) of emulsion-based drinks with various hydrocolloid systems

|  | Emulsion no hydrocolloids | Standard CMC + gellan | Standard CMC + gellan, no oil | Sodium alginate, no gellan | Sodium alginate + gellan | Sodium alginate + locust bean gum | Pectin + gellan |
|---|---|---|---|---|---|---|---|
| Rapeseed protein isolate | 3.5 | 3.5 | 3.5 | 3.5 | 3.5 | 3.5 | 3.5 |
| Sodium chloride | 0.08 | 0.08 | 0.08 | 0.08 | 0.08 | 0.08 | 0.08 |
| Tricalcium phosphate | 0.33 | 0.33 | 0.33 | 0.33 | 0.33 | 0.33 | 0.33 |
| High acyl-gellan |  | 0.04 | 0.04 |  | 0.04 |  | 0.04 |
| CMC |  | 0.4 | 0.6 |  |  |  |  |
| Sodium alginate |  |  |  | 0.6 | 0.6 | 0.6 |  |
| LM-pectin |  |  |  |  |  |  | 0.6 |
| Locust bean gum |  |  |  |  |  | 0.1 |  |
| Sunflower oil | 1.8 | 1.8 |  | 1.8 | 1.8 | 1.8 | 1.8 |
| Sunflower lecithin | 0.2 | 0.2 |  | 0.2 | 0.2 | 0.2 | 0.2 |

All products came out smoothly from the processing, however some showed sedimentation, as is indicated in the Table below.

TABLE

Percentage of sediment (visual observation) after given time of drinks of previous Table

|  | 1 hour | 1 day | 1 week |
|---|---|---|---|
| Emulsion no hydrocolloids | 28 | 68 | 75 |
| Standard CMC + gellan | 0 | 0 | 0 |
| Standard CMC + gellan, no oil | 13 | 19 | 50 |
| Sodium alginate, no gellan | 0 | 0 | 0 |
| Sodium alginate + gellan | 0 | 0 | 0 |
| Sodium alginate + locust bean gum | 0 | 1 | 1 |
| Pectin + gellan | 6 | 43 | 63 |

The sedimentation pattern given in the Table shows that the standard emulsion with CMC and gellan was stable. When the hydrocolloids were left out, the protein and oil droplets and the calcium phosphate rapidly sedimented. Without the oil, the protein flocs slowly sedimented under these conditions, showing that the presence of oil makes the composition more stable. Furthermore, it shows that the stability could be obtained also by sodium alginate, alone or in combination with high acyl-gellan or locust bean gum. In a stress test by extra centrifugation (10,000 rpm for 15 minutes at 20° C., using a Thermo Scientific centrifuge (Sorvall RC 6 Plus, F10S 6X500Y rotor)) it was shown that the combination of alginate and gellan was more stable, leaving nearly all protein suspended, whereas in the absence the amount of protein in the supernatant halved compared to the uncentrifuged product. The combination with LM Pectin replacing CMC, with high acyl-gellan, also leads to more stability than the product without hydrocolloids, although in practice a higher pectin concentration might be needed. The pH of the products was 7.3+/−0.2, except for the product with pectin, that lowered to 6.9. It was concluded that hydrocolloids are needed to keep the protein-based emulsions stable, and that CMC can be replaced by sodium alginate or LM pectin and that the role of high acyl-gellan to keep flocs of protein coated oil droplets and calcium suspended can also be taken up by for instance locust bean gum. Also it was shown that the emulsion state is more stable than the protein flocs without oil droplets (similar to Example 5).

Example 12

Emulsion-Based Drinks with Various Hydrocolloid Systems

Emulsions with overall the same composition, but with different hydrocolloids, see Table below, were prepared in the same way as described in the previous examples, and analyzed only by visual observation. It was shown that addition of low acyl-gellan led to improved stability.

TABLE

Variation of hydrocolloids

| # | Hydrocolloid mixture | Remarks |
|---|---|---|
| A | 0.04% high acyl-gellan + 0.4% CMC | Standard composition: stable |
| B | 0.04% high acyl-gellan | Unstable |
| C | 0.04% high acyl-gellan + 0.04% low acyl-gellan | Medium instability, higher concentration needed |

The invention claimed is:

1. A composition comprising rapeseed protein, a hydrocolloid, a vegetable oil, and water
   wherein an amount of the rapeseed protein is from 0.5-10% (w/w),
   wherein an amount of the hydrocolloid is from 0.02-1% (w/w),
   wherein an amount of the vegetable oil is from 0.5-15% (w/w), and
   wherein said hydrocolloid is gellan gum, carboxymethyl cellulose, alginate, locust bean gum, pectin, and/or guar gum.

2. The composition according to claim 1, wherein the composition further comprises an emulsifier.

3. The composition according to claim 1, said composition has a pH, when measured at 20±2° C., between 6.5 and 8.0.

4. The composition according to claim 1, wherein said composition further comprises sweetening agents and/or flavoring agents and/or coloring agents and/or calcium salts.

5. The composition according to claim 1, wherein said rapeseed protein is native rapeseed protein isolate comprising 40 to 65% (w/w) cruciferins and 35 to 60% (w/w) napins, a sum of the cruciferins and the napins not exceeding 100% (w/w), wherein the native rapeseed protein isolate comprises at least 5% (on dry matter) 12S rapeseed protein.

6. The composition according to claim 2, wherein said emulsifier is lecithin.

7. The composition according to claim 1, wherein said gellan gum is high acyl gellan gum, low acyl gellan gum or a combination thereof.

8. A method for preparation of the composition according to claim 1, said method comprising:
  a) preparing a first aqueous solution comprising the rapeseed protein,
  b) preparing a second aqueous solution comprising the hydrocolloid,
  c1) mixing the vegetable oil and the first aqueous solution followed by addition of the second aqueous solution to form a first mixture, or
  c2) mixing the first aqueous solution and the second aqueous solution, followed by addition of the vegetable oil to form a second mixture, and
  d) emulsifying the first mixture or the second mixture to form the composition.

9. The method according to claim 8, wherein an emulsifier is added before, after or during the c1) or the c2).

10. The method according to claim 9, wherein said hydrocolloid is carboxymethyl cellulose and/or high acyl gellan gum and wherein said emulsifier is lecithin.

11. The method according to claim 8, wherein the method further comprises:
  adding the composition to a beverage; and
  heating the beverage at a temperature of from 70° C. to 150° C. for 2 seconds to 5 minutes following the adding of said composition to said beverage.

12. A food product comprising the composition according to claim 1.

13. The food product according to claim 12, wherein said food product is a plant protein fortified beverage.

14. A beverage comprising the composition according to claim 1.

15. The beverage according to claim 14, wherein the beverage is packaged in a container.

* * * * *